United States Patent
Humfeld

(10) Patent No.: US 11,341,610 B2
(45) Date of Patent: May 24, 2022

(54) DEPLOYABLE AIRBORNE SENSOR ARRAY SYSTEM AND METHOD OF USE

(71) Applicant: The Boeing Company, Huntington Beach, CA (US)

(72) Inventor: Keith Daniel Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1209 days.

(21) Appl. No.: 14/540,408

(22) Filed: Nov. 13, 2014

(65) Prior Publication Data

US 2017/0024854 A1 Jan. 26, 2017

(51) Int. Cl.
*G06T 3/40* (2006.01)
*B64D 3/00* (2006.01)
*B64C 39/02* (2006.01)
*B64D 47/08* (2006.01)

(52) U.S. Cl.
CPC .......... *G06T 3/4053* (2013.01); *B64C 39/022* (2013.01); *B64D 3/00* (2013.01); *B64D 47/08* (2013.01); *B64C 2201/123* (2013.01); *B64C 2201/148* (2013.01); *G06T 2207/10012* (2013.01); *G06T 2207/10044* (2013.01); *G06T 2207/30212* (2013.01); *G06T 2207/30232* (2013.01)

(58) Field of Classification Search
CPC .. B64C 39/022; B64C 2201/127; B64D 47/08
See application file for complete search history.

(56) References Cited

U.S. PATENT DOCUMENTS

| | | | |
|---|---|---|---|
| 2,400,400 | A | 5/1946 | Duer |
| 5,231,480 | A | 7/1993 | Ulich |
| 7,900,866 | B2 | 3/2011 | Kutzmann et al. |
| 2002/0145554 | A1 | 10/2002 | Lloyd et al. |
| 2003/0068981 | A1 | 4/2003 | Duthie |
| 2008/0262724 | A1 | 10/2008 | Bodin et al. |
| 2009/0134273 | A1 | 5/2009 | Page et al. |

(Continued)

FOREIGN PATENT DOCUMENTS

| | | |
|---|---|---|
| CN | 102114914 A | 7/2011 |
| CN | 103868498 A | 6/2014 |

(Continued)

OTHER PUBLICATIONS

Extended European Search Report for Application No. 15194150.7, dated Apr. 20, 2016, 8 pages.

(Continued)

*Primary Examiner* — Y Lee
(74) *Attorney, Agent, or Firm* — Armstrong Teasdale LLP

(57) ABSTRACT

A deployable airborne sensor array system and method of use are provided herein. The system includes a tether configured to be coupled to and deployed from an aircraft and a plurality of airborne vehicles coupled to the tether. Each of the plurality of airborne vehicles includes different lift characteristics to form a three-dimensional (3D) array of airborne vehicles. Each airborne vehicle includes a sensing device configured to generate sensor data associated with a target. The system also include a computing device configured to process the sensor data received from each of the plurality of airborne vehicles and generate an image of the target based on the sensor data.

2 Claims, 9 Drawing Sheets

(56) References Cited

U.S. PATENT DOCUMENTS

2013/0062464 A1    3/2013   Speer
2013/0233964 A1    9/2013   Woodworth et al.

FOREIGN PATENT DOCUMENTS

| | | |
|---|---|---|
| CN | 104062933 A | 9/2014 |
| JP | 2000180100 A | 8/2000 |
| JP | 2009017322 A | 1/2009 |
| JP | 2014122019 A | 7/2014 |
| JP | 2014126299 A | 7/2014 |

OTHER PUBLICATIONS

Canada Office Action for related application 2,905,887 dated Sep. 28, 2018; 3 pp.
Chinese First Office Action and Search Report regarding Application No. 201510750461.5 dated Jan. 28, 2019 with English translation; pp. 1-17.
Examination Report regarding Canadian Patent Application No. 2,905,887 dated Apr. 8, 2019; pp. 1-4.
Japanese Office Action regarding Japanese Patent Application No. 2015-186445 dated Aug. 22, 2019; pp. 1-4.

DEPLOYABLE AIRBORNE SENSOR ARRAY SYSTEM AND METHOD OF USE

BACKGROUND

This invention relates generally to airborne sensors, and more particularly, to a deployable airborne sensor array system and method of use.

At least some known air surveillance and reconnaissance systems use an aerial vehicle coupled to a tether. The tether restricts the flight space, so that a fly-away will not occur. The aerial vehicle may include a sensor for surveillance or other data gathering relating to a target. Some systems typically include only a single sensor on a single aerial vehicle, which limits the amount of data that can be gathered. Other known systems include a plurality of aerial vehicles tethered to a ground station. Such systems may be limited in their range of operation and ability to position the aerial vehicles relative to one another.

BRIEF DESCRIPTION

In one aspect, a deployable airborne sensor array system is provided. The system includes a tether configured to be coupled to and deployed from an aircraft and a plurality of airborne vehicles coupled to the tether. Each of the plurality of airborne vehicles includes different lift characteristics to form a three-dimensional (3D) array of airborne vehicles. Each airborne vehicle includes a sensing device configured to generate sensor data associated with a target. The system also include a computing device configured to process the sensor data received from each of said plurality of airborne vehicles and generate an image of the target based on the sensor data.

In another aspect, a method is provided. The method includes deploying a tether from an aircraft, the tether including a plurality of airborne vehicles coupled to the tether. Each of the plurality of airborne vehicles includes different lift characteristics to form a three-dimensional (3D) array of airborne vehicles. Each airborne vehicle includes a sensing device configured to generate sensor data associated with a target. The method also includes processing, by a computing device, sensor data associated with a target received from each of the plurality of airborne vehicles. The sensor data is generated by a sensing device coupled to each airborne vehicle. The method further includes generating, by the computing device, an image of the target based on the sensor data.

The features, functions, and advantages that have been discussed can be achieved independently in various implementations or may be combined in yet other implementations further details of which can be seen with reference to the following description and drawings.

DETAILED DESCRIPTION

Figure 1:
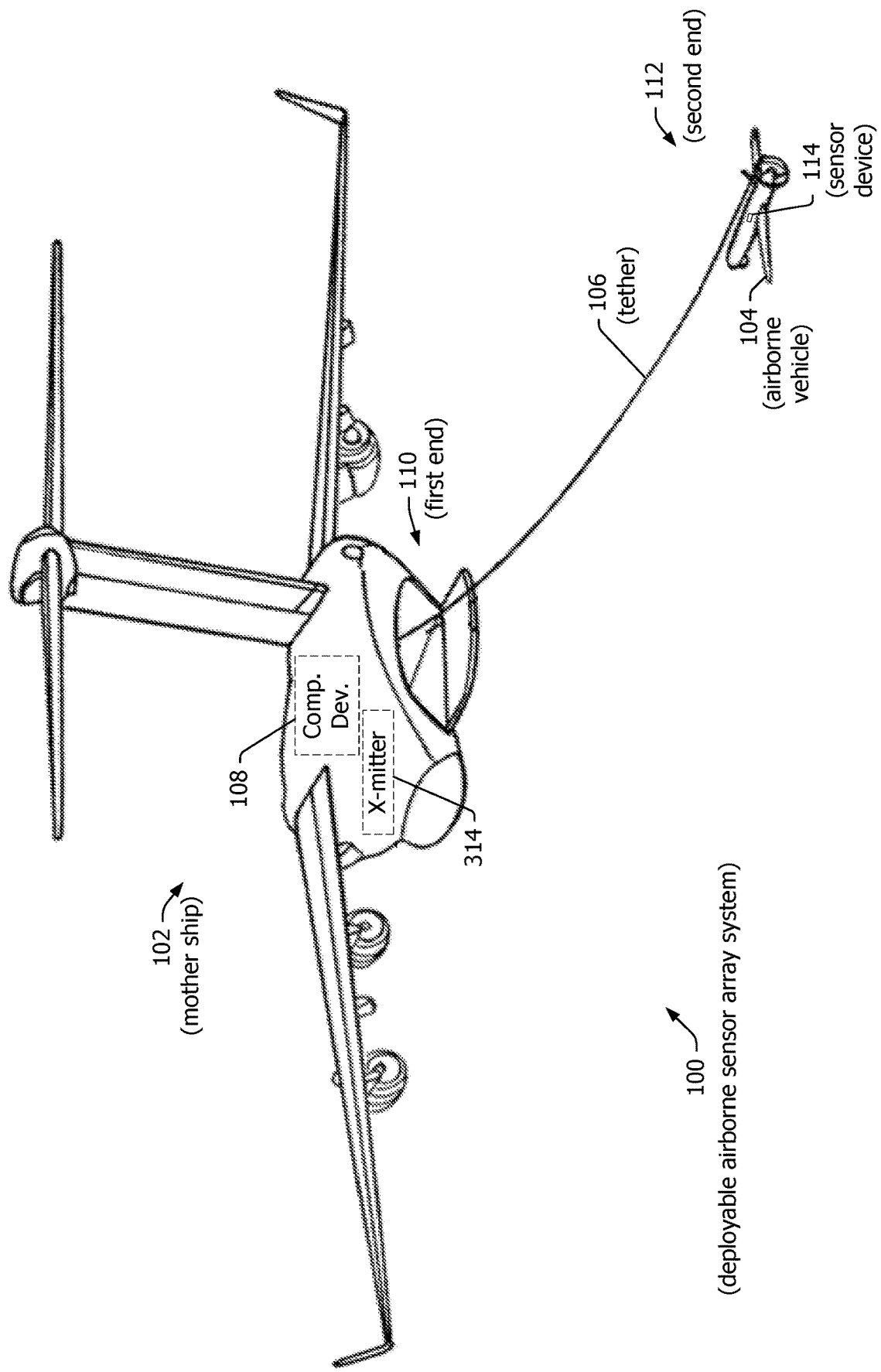
FIG. 1 is a block diagram of an exemplary deployable airborne sensor array system.

FIG. 1 is a block diagram of an exemplary deployable airborne sensor array system 100. In the exemplary implementation, system 100 includes an airborne mother ship 102 configured to deploy and tow one or more airborne vehicles 104 coupled to a flexible tether 106. System 100 also includes a computing device 108 in communication with each airborne vehicle 104.

In the exemplary implementation, tether 106 includes a first end 110 coupled to airborne mother ship 102, and a second end 112 extending outward behind airborne mother ship 102. Mother ship 102 includes a tether management system (not shown) or other securing means for retaining and controlling the amount of tether released. The tether management system may be, for example, a winch or any other mechanical device that is capable of pulling in, letting out, or otherwise adjusting the tension/length of tether 106.

In the exemplary implementation, each airborne vehicle 104 includes a sensor device 114 configured to generate sensor data associated with a target object (not shown). Sensor device 114 may include, for example, a surveillance imaging camera, one or more microphones, thermometers, hygrometers, barometers, anemometers, pyranometers, or any other sensor that enables system 100 to function as described herein. The sensor data collected by airborne vehicle 104 via sensor devices 114 is transmitted in real time to computing device 108. The sensor data may also be transmitted to an end user for viewing or to a computer-implemented database where the sensor data may be stored. The end user may be located at, for example, airborne mother ship 102, a ground station (not shown), or at a remote location where access is provided via a network (e.g., the Internet). The sensor data transmission may be wireless or wired. When a wired communication link is employed, it may be accomplished via conductors embedded in tether 106.

In the exemplary implementation, Computing device 108 may be located at, for example, airborne mother ship 102, a ground station (not shown), or at a remote location where access is provided via a network (e.g., the Internet). Computing device 108 is configured to receive and process the sensor data received from airborne vehicles 104, and generate an image of the target object based on the sensor data, as described in more detail herein.

Figure 2:
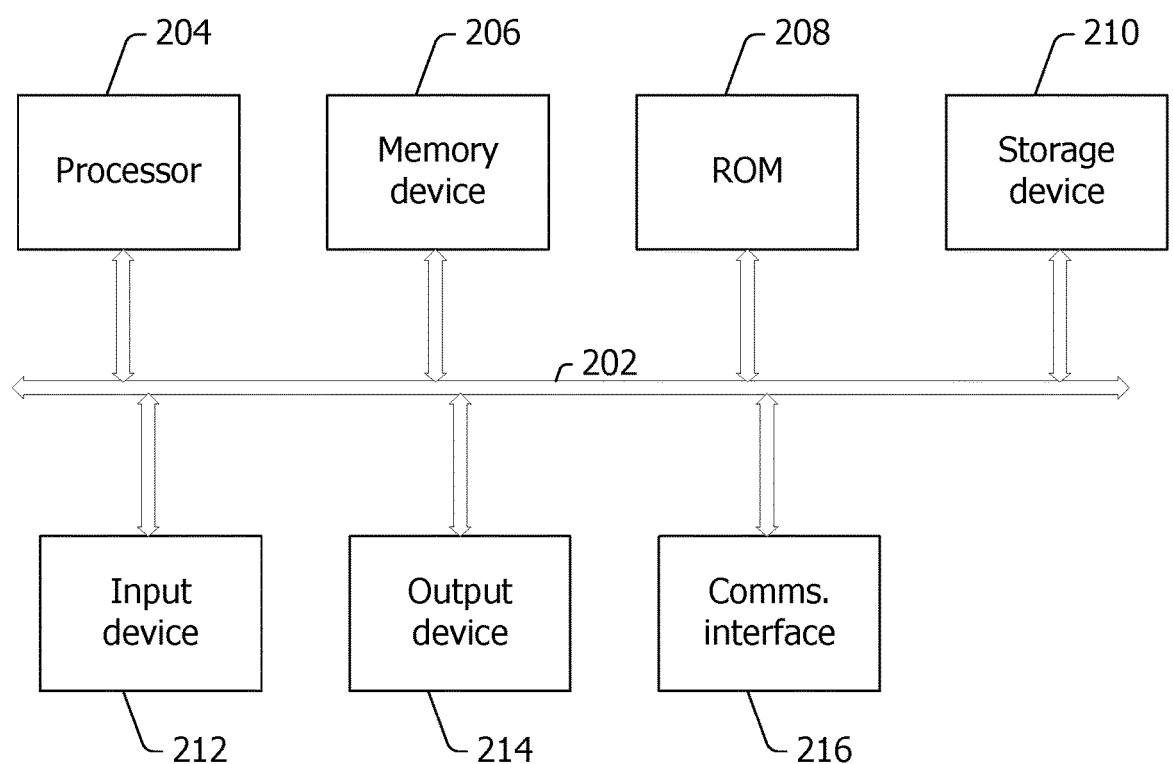
FIG. 2 is a block diagram of an example computing device that may that may generate an image of a target object.

FIG. 2 is a block diagram of an example computing device 200 that may generate an image of a target object. In the exemplary implementation, computing device 200 is similar to computing device 108 (shown in FIG. 1). Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Main memory 206 may include a random access memory (RAM) or another type of dynamic storage device that stores information and instructions for execution by processor 204. ROM 208 may include a conventional ROM device or another type of static storage device that stores static information and instructions for use by processor 204. Storage device 210 may include a magnetic and/or optical recording medium and its corresponding drive. In some implementations, storage device 210 includes wind data received from one or more airborne vehicles 104.

Input device 212 may include a conventional mechanism that permits computing device 200 to receive commands, instructions, or other inputs from a user, including visual, audio, touch, button presses, stylus taps, etc. Additionally, input device may receive location information. Accordingly, input device 212 may include, for example, a camera, a microphone, one or more buttons, a mouse, and/or a touch screen. Output device 214 may include a conventional mechanism that outputs information to a user, including a display (including a touch screen) and/or a speaker. Communication interface 216 may include any transceiver-like mechanism that enables computing device 200 to communicate with other devices and/or systems. For example, communication interface 216 may include mechanisms for communicating with one or more airborne vehicles 104, sensor devices 114, and/or another computing device.

As described herein, computing device 200 facilitates generating an image of the target object based on the sensor data received from sensor devices 114. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. In other implementations, hardwired circuitry may be used in place of or in combination with software instructions to implement processes consistent with the subject matter herein. Thus, implementations consistent with the principles of the subject matter disclosed herein are not limited to any specific combination of hardware circuitry and software.

Figure 3:
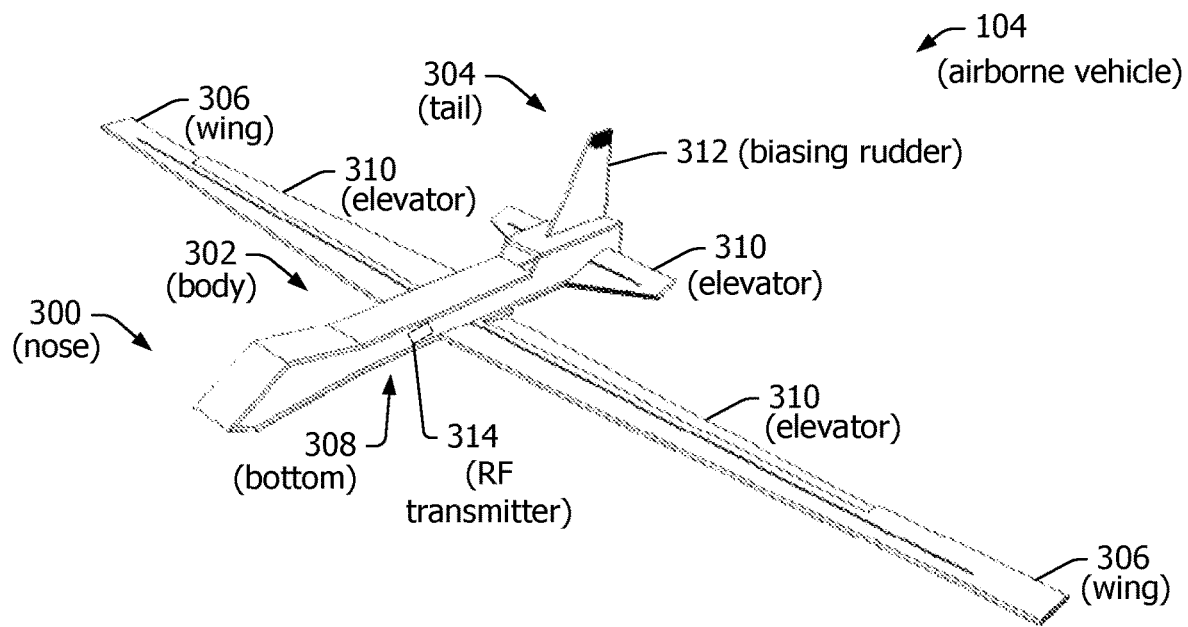
FIG. 3 is an illustration of an exemplary implementation of the airborne vehicle shown in FIG. 1.

FIG. 3 is an illustration of an exemplary implementation of airborne vehicle 104 (shown in FIG. 1). In the exemplary implementation, airborne vehicle 104 is an unmanned aerial vehicle (UAV); however, airborne vehicle 104 may be any type of airborne sensor vehicle that enables system 100 to function as described herein. Airborne vehicle 104 includes a nose portion 300, a body portion 302, a tail portion 304, and wings 306 coupled to body portion 302. Sensor device 114 is coupled to a bottom portion 308 of airborne vehicle 104 to provide sensor device 114 with an unobstructed line-of-sight towards the target object.

In the exemplary implementation, each of wings 306 and/or tail portion 304 includes an elevator 310 that facilitates adjusting vertical lift of airborne vehicle 104. For example, positioning elevator 310 horizontally would cause airborne vehicle 104 to fly substantially directly behind mother ship 102. Biasing elevator 310 downward relative to a horizontal axis would generate lift on airborne vehicle 104, causing it to fly at a higher elevation than mother ship 102. Biasing elevator 310 upward relative to the horizontal axis would generate a downward force on airborne vehicle 104, causing it to fly at a lower elevation than mother ship 102. The angle of elevators 310 of the plurality of airborne vehicles 104 may be biased at different angles relative to the horizontal axis so that sensor devices 114 can collect sensor data from varying perspectives relative to the target object.

In the exemplary implementation, tail portion 304 includes a rudder 312 that facilitates adjusting horizontal lift of airborne vehicle 104. For example, biasing rudder 312 straight behind airborne vehicle 104 relative to direction of flight would cause airborne vehicle 104 to fly substantially directly behind mother ship 102. From the perspective of airborne vehicle 104 looking towards mother ship 102, biasing rudder 312 towards the left relative to a vertical axis would generate lift causing airborne vehicle 104 to fly to the right of mother ship 102. Alternatively, biasing rudder 312 towards the right relative to the vertical axis would generate lift causing airborne vehicle 104 to fly to the left of mother ship 102. The angles of elevators 310 of the plurality of airborne vehicles 104 may be biased at different angles relative to the vertical axis to provide varying perspectives of the target object.

In an alternative implementation, airborne vehicle 104 includes a propulsion system (not shown) configured to provide thrust to control flight of airborne vehicle 104. The propulsion system may be any type of propulsion system known in the art for providing thrust on an airborne vehicle.

Figure 4:
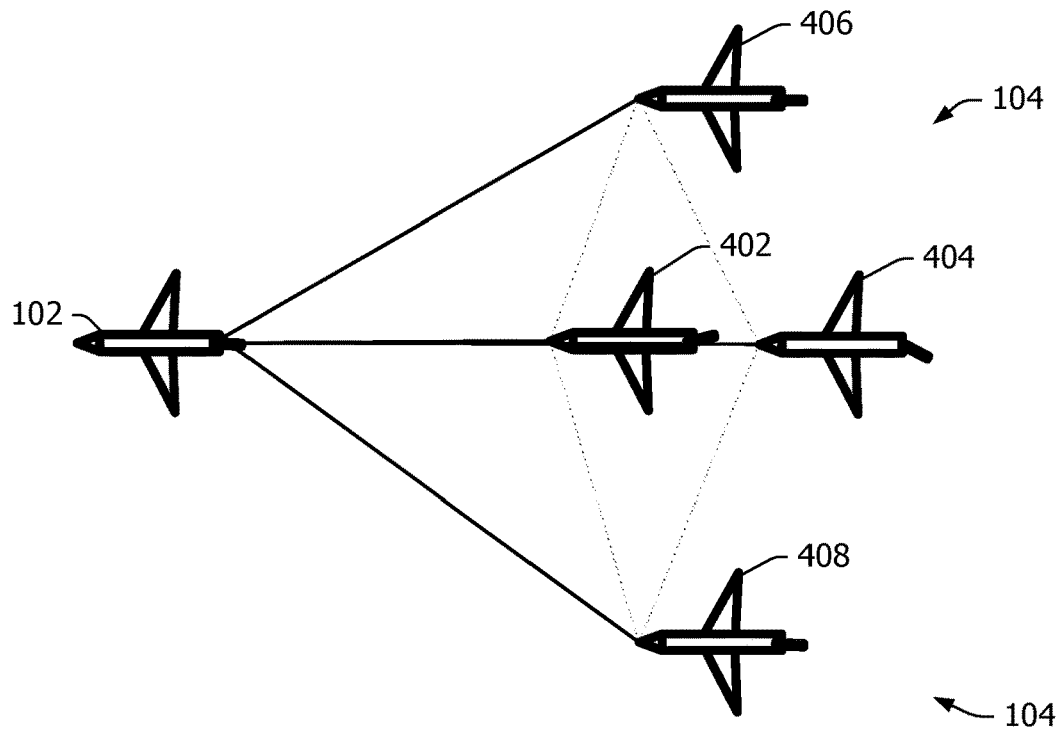
FIG. 4 is a block diagram of an exemplary deployable sensor array.

FIG. 4 is a block diagram of an exemplary deployable sensor array 400. In the exemplary implementation, each airborne vehicle 104 is designed to have different lift characteristics such that the positions of airborne vehicles 104 relative to mother ship 102 and to each other are known. For example, different lift characteristics include unbalanced wings 306 on at least first and second airborne vehicles 402 and 404 that cause them to glide to the left and to the right of mother ship 102, respectively. Different lift characteristics further include a positive lift profile and negative lift profile on at least third and fourth airborne vehicles 406 and 408 that cause them to glide above and below the aircraft, respectively. The different lift characteristics cause the plurality of airborne vehicles 104 to establish a three-dimensional array of sensors operating coherently to capture a three-dimensional view of a target at an instant in time.

Figure 5:
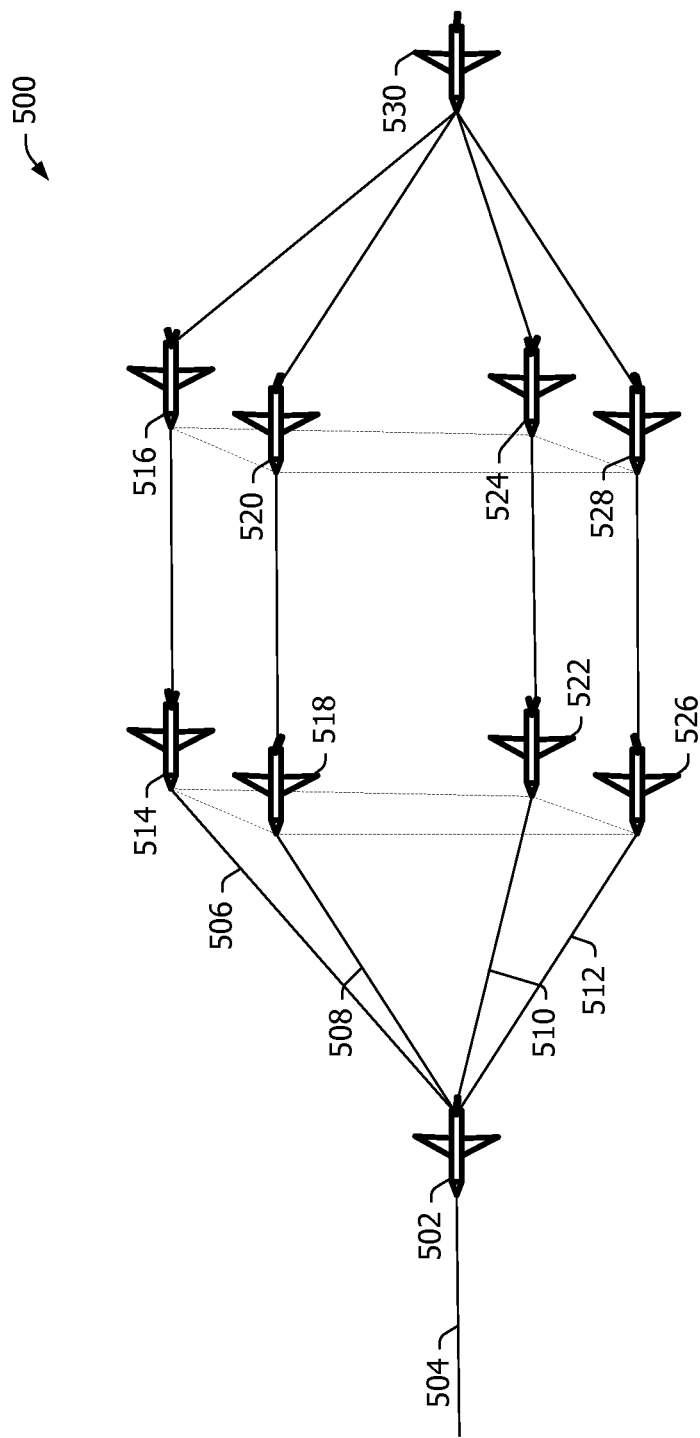
FIG. 5 is a block diagram of an exemplary deployable sensor array.

FIG. 5 is a block diagram of an exemplary deployable sensor array 500. In the exemplary implementation, array 500 includes a first airborne vehicle 502 coupled to a first tether 504. Coupled to first airborne vehicle 502 are a second tether 506, a third tether 508, a fourth tether 510, and a fifth tether 512. A second airborne vehicle 514 and a third airborne vehicle 516 are coupled to second tether 506. A fourth airborne vehicle 518 and a fifth airborne vehicle 520 are coupled to third tether 508. A sixth airborne vehicle 522 and a seventh airborne vehicle 524 are coupled to fourth tether 510. An eighth airborne vehicle 526 and a ninth airborne vehicle 528 are coupled to fifth tether 512. Second, third, fourth, and fifth tethers 506, 508, 510, and 512 converge and are coupled to a tenth airborne vehicle 530. The dotted lines are merely provided to illustrate that airborne vehicles 104 are in a 3D configuration. Second and third airborne vehicles 514 and 516 are configured to glide above and to the right of mother ship 102. Fourth and fifth airborne vehicles 518 and 520 are configured to glide above and to the left of mother ship 102. Sixth and seventh airborne vehicles 522 and 524 are configured to glide below and to the right of mother ship 102. Eighth and ninth airborne vehicles 526 and 528 are configured to glide below and to the left of mother ship 102. Alternatively, airborne vehicles 104 may be positioned in any configuration that enables deployable sensor array system 100 to function as described herein.

Figure 6:
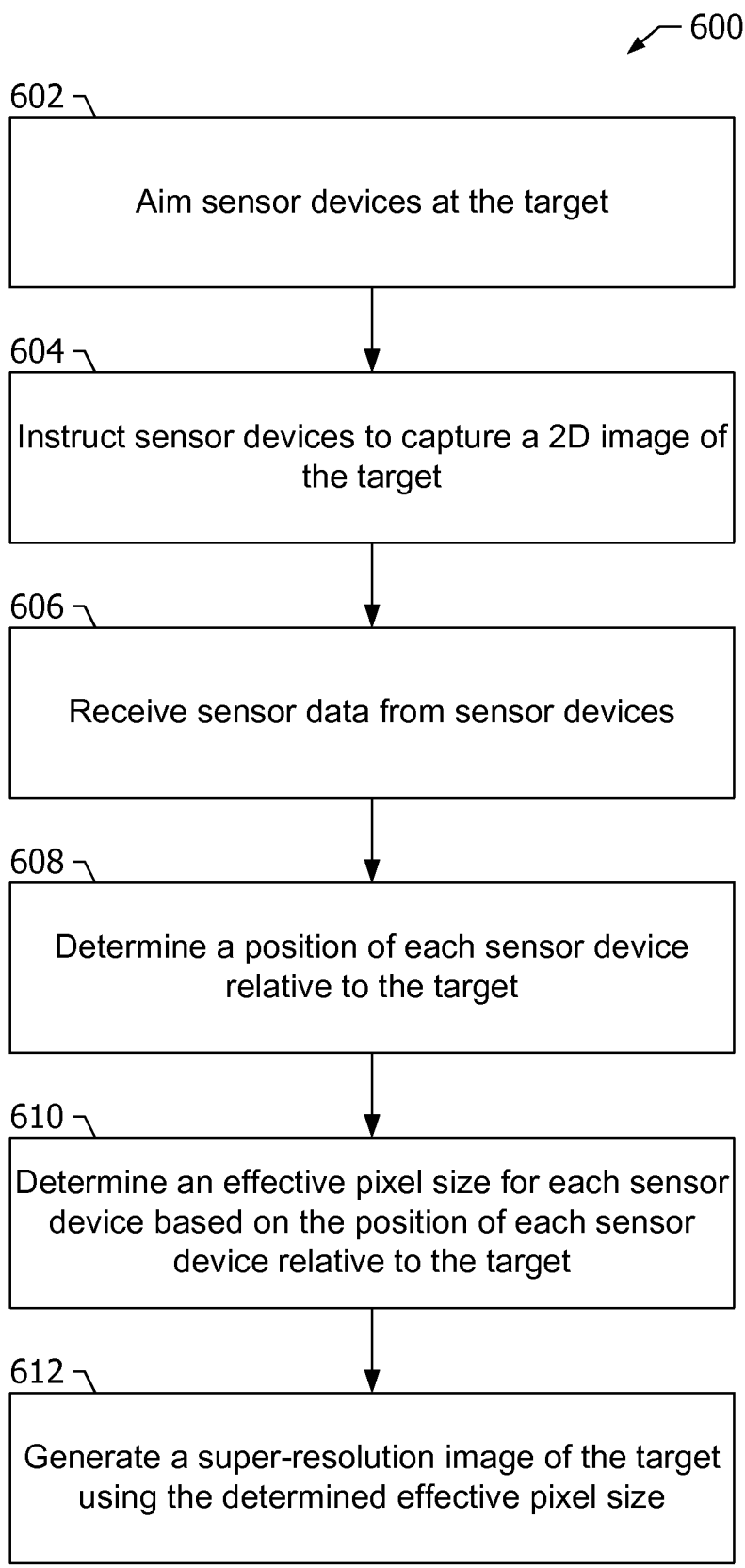
FIG. 6 is a flow chart of a process that may be performed by the computing device shown in FIG. 2 for generating a super-resolution image of a target.

FIG. 6 is a flow chart of a process 600 that may be performed by computing device 200 (shown in FIG. 2) for generating a super-resolution image of a target. Initially, processor 204 of computing device 200 aims 602 the plurality of sensor devices 114 at the target. The target may be selected by computing device 200 or may be input into computing device 200 by a user. Processor 204 then instructs 604 sensor devices 114 to capture a two-dimensional (2D) image of the target. Each sensor device 114 transmits the 2D images to computing device 200 as sensor data. Communication interface 216 of computing device 200 receives 606 the sensor data from sensor devices 114.

In the exemplary implementation, computing device 200 determines 608 a position of each sensor device 114 relative to the target. A position of each sensor device 114 relative to mother ship 102 is known, so using a global positioning system or other position measuring device, a position of mother ship 102 relative to the target may be determined. Using geometry, the position of each sensor device 114 relative to the target may then be determined.

Computing device 200 then determines 610 an effective pixel size for each sensor device 114 based on the position of each sensor device 114 relative to the target. Finally, computing device 200 generates 612 a super-resolution image of the target using the determined effective pixel size for each sensor device 114.

Figure 7:
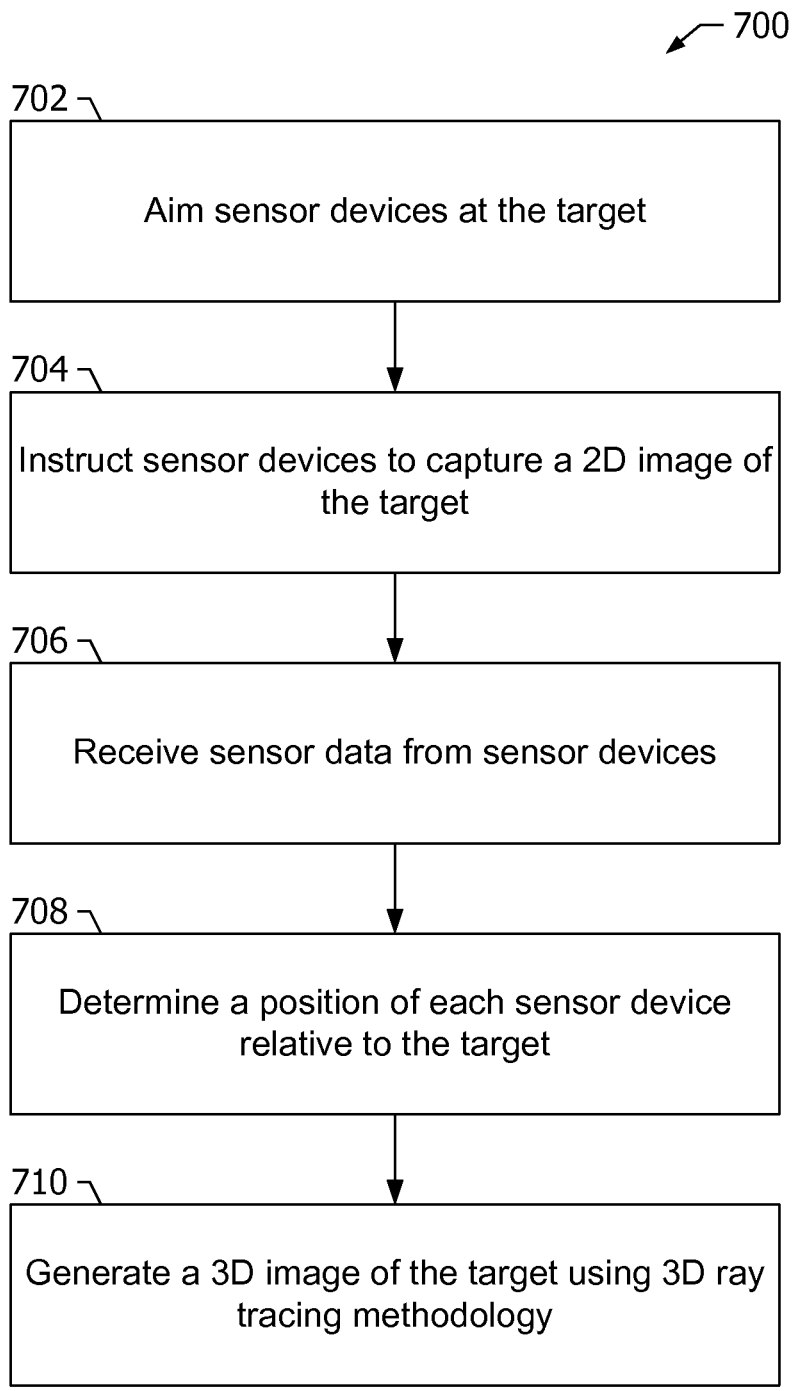
FIG. 7 is a flow chart of a process that may be performed by the computing device shown in FIG. 2 for generating a three-dimensional (3D) image of a target.

FIG. 7 is a flow chart of a process 700 that may be performed by computing device 200 (shown in FIG. 2) for generating a three-dimensional (3D) image of a target. Initially, processor 204 of computing device 200 aims 702 the plurality of sensor devices 114 at the target. The target may be selected by computing device 200 or may be input into computing device 200 by a user. Processor 204 then instructs 704 sensor devices 114 to capture a two-dimensional (2D) image of the target. Each sensor device 114 transmits the 2D images to computing device 200 as sensor data. Communication interface 216 of computing device 200 receives 706 the sensor data from sensor devices 114.

In the exemplary implementation, computing device 200 determines 708 a position of each sensor device 114 relative to the target. A position of each sensor device 114 relative to mother ship 102 is known, so using a global positioning system or other position measuring device, a position of mother ship 102 relative to the target may be determined. Using geometry, the position of each sensor device 114 relative to the target may then be determined.

In the exemplary implementation, computing device 200 generates 710 a 3D image of the target using 3D ray tracing methodology. The 3D image is generated based on the position of each sensor device 114 relative to the target.

Figure 8:
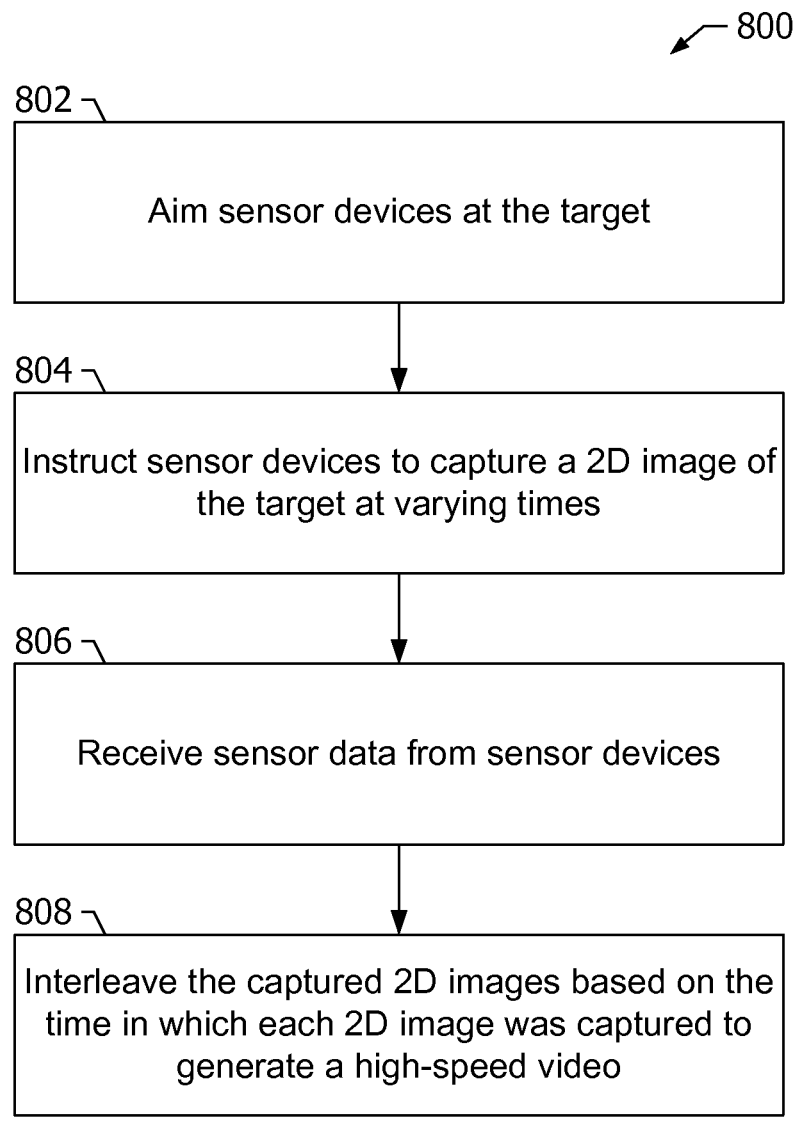
FIG. 8 is a flow chart of a process that may be performed by the computing device shown in FIG. 2 for generating a high-speed video of a target.

FIG. 8 is a flow chart of a process 800 that may be performed by computing device 200 (shown in FIG. 2) for generating a high-speed video of a target. Initially, processor 204 of computing device 200 aims 802 the plurality of sensor devices 114 at the target. The target may be selected by computing device 200 or may be input into computing device 200 by a user. Processor 204 then instructs 804 sensor devices 114 to capture a two-dimensional (2D) image of the target at varying times. The varying times may be specified by a user or pre-programmed into computing device 200. Each sensor device 114 transmits the 2D images to computing device 200 as sensor data. Communication interface 216 of computing device 200 receives 806 the sensor data from sensor devices 114. Computing device 200 then interleaves 808 the captured 2D images based on the time in which each 2D image was captured to generate a high-speed video of the target.

Figure 9:
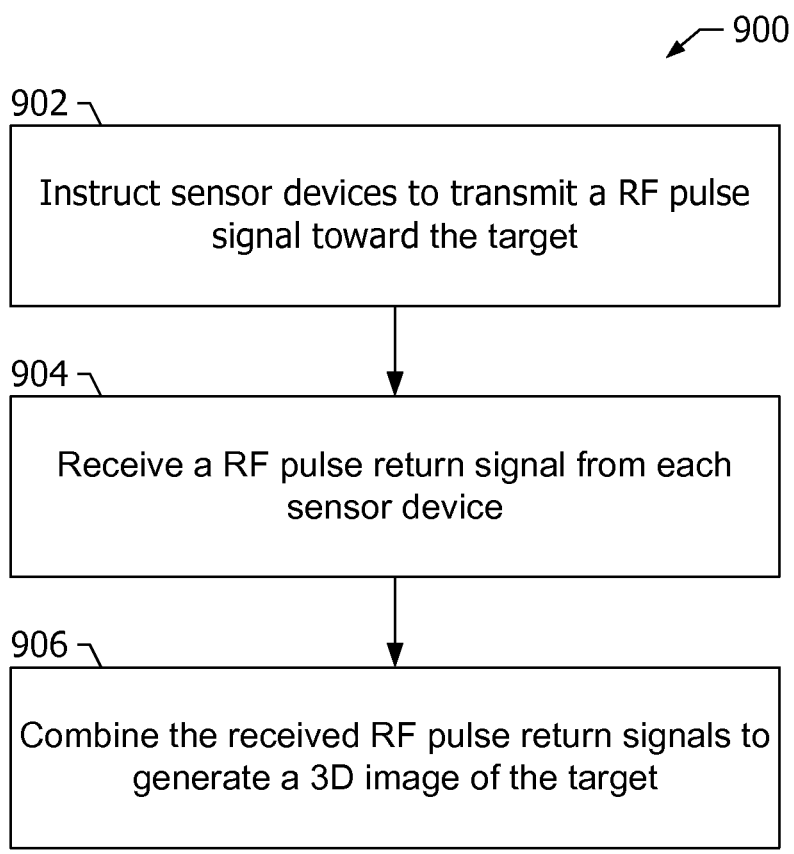
FIG. 9 is a flow chart of a process that may be performed by the computing device shown in FIG. 2 for generating a 3D image of a target having increased azimuth resolution.

FIG. 9 is a flow chart of a process 900 that may be performed by computing device 200 (shown in FIG. 2) for generating a 3D image of a target having increased azimuth resolution. Initially, processor 204 of computing device 200 instructs 902 a transmitter 314 (shown in FIGS. 1 and 3) on mother ship 102 or on a sensor device 114 to transmit a radio frequency (RF) pulse signal toward the target. In the exemplary implementation, sensor devices 114 include radio receivers. Each sensor device 114 receives an RF pulse return signal, which is transmitted to computing device 200. Communication device 216 of computing device 200 receives 904 the radio frequency pulse return signal from each sensor device 114. Computing device 200 then combines 906 the received radio frequency pulse return signals to generate a 3D image of the target having increased azimuth resolution.

The RF pulse is detected by a specific sensor device 114 after an amount of time determined by the path length from RF pulse transmitter 314 to any reflecting object and then from the reflecting object to the specific sensor device 114. Returns from everywhere with the same total path length from transmitter 314 to the specific sensor device 114 arrive at the same time. Because the sensor device 114 is moving relative to the scene, the Doppler shift will indicate the azimuth from which the components of the signal are returning. The intensity of the returns detected by specific sensor device 114, as a function of frequency and time of return, provide the data to develop a two-dimensional radar image. Another sensor device 114 has a different set of positions that have equal path lengths from transmitter 314 to the receiver with different Doppler shifts. Combining these leads to higher azimuth and range resolution than provided by the Doppler effect or other known methods. When sensor devices 114 are also at different altitudes (elevation angles), computing device 200 can generate a full 3D image via radar. The combined return signals together with the 3D image via radar may be used to determine a vector of incoming radio wavelength signal. The intensity return of an object changes with direction of the reflection, so detectors in different directions may be used to map out and produce better identification of the objects in the scene.

Figure 10:
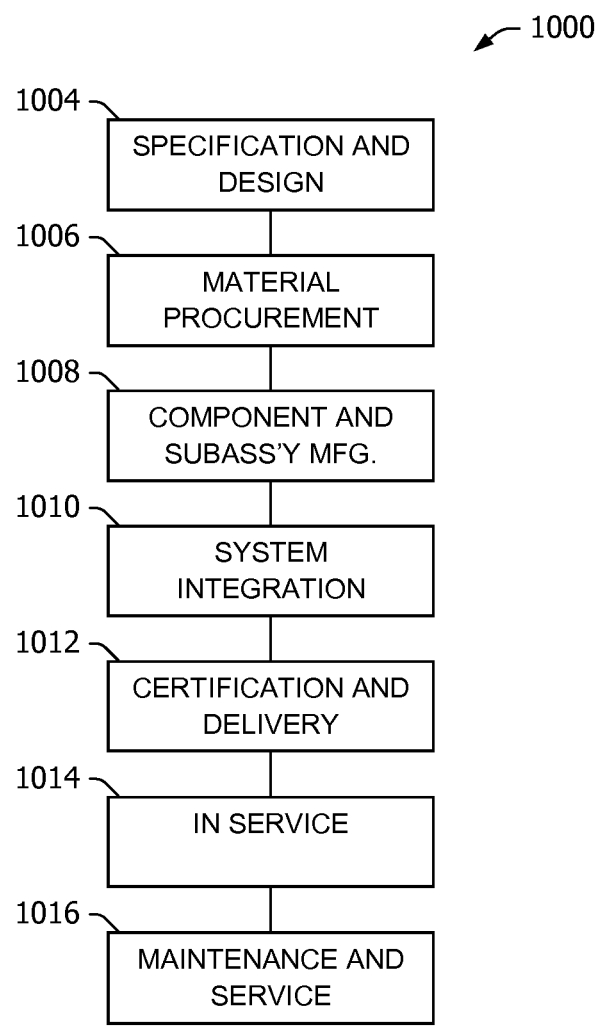
FIG. 10 is a flow diagram of an exemplary aircraft production and service methodology.
Figure 11:
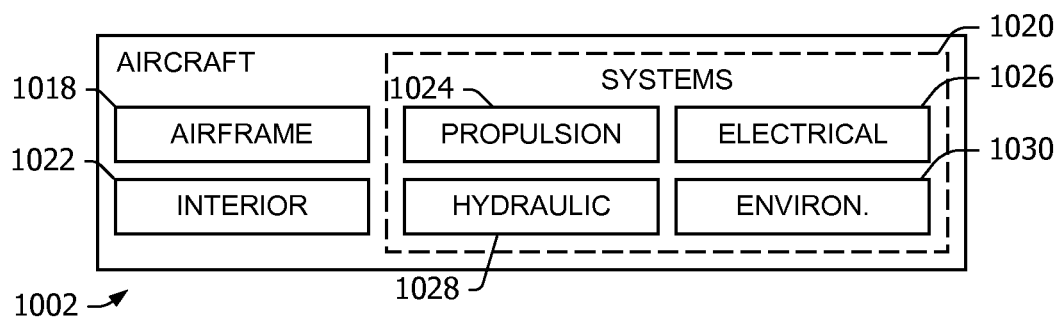
FIG. 11 is a block diagram of an exemplary aircraft.

FIG. 10 is a flow diagram of an exemplary aircraft production and service methodology. FIG. 11 is a block diagram of an exemplary aircraft. Implementations of the disclosure may be described in the context of an aircraft manufacturing and service method 1000 (shown in FIG. 10) and via an aircraft 1002 (shown in FIG. 11). During pre-production, including specification and design 1004 data of aircraft 1002 may be used during the manufacturing process and other materials associated with the airframe may be procured 1006. During production, component and subassembly manufacturing 1008 and system integration 1010 of the aircraft 1002 occurs, prior to aircraft 1002 entering its certification and delivery process 1012. Upon successful satisfaction and completion of airframe certification, aircraft 1002 may be placed in service 1014. While in service by a customer, aircraft 1002 is scheduled for periodic, routine, and scheduled maintenance and service 1016, including any modification, reconfiguration, and/or refurbishment, for example.

Each portion and process associated with aircraft manufacturing and/or service 1000 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, an aircraft 1002 produced via method 1000 may include an airframe 1018 having a plurality of systems 1020 and an interior 1022. Examples of high-level systems 1020 include one or more of a propulsion system 1024, an electrical system 1026, a hydraulic system 1028, and/or an environmental system 1030. Any number of other systems may be included. Although an aircraft example is shown, the principles of the invention may be applied to non-aviation industries, such as the automotive industry.

Systems and methods embodied herein may be employed during any one or more of the stages of method 1000. For example, components or subassemblies corresponding to component production process 1008 may be fabricated or manufactured in a manner similar to components or subassemblies produced while aircraft 1002 is in service. Also, one or more system implementations, method implementations, or a combination thereof may be utilized during the production stages 1008 and 1010, for example, by substantially expediting assembly of, and/or reducing the cost of assembly of aircraft 1002. Similarly, one or more of system implementations, method implementations, or a combination thereof may be utilized while aircraft 1002 is being serviced or maintained, for example, during scheduled maintenance and service 1016.

The methods and systems described herein provide a technical effect of enabling a user to be presented with more detailed and accurate data relating to a target. An exemplary technical effect of the methods and systems described herein includes at least one of: (a) deploying a tether from an aircraft, the tether including a plurality of airborne vehicles coupled to the tether, each of the plurality of airborne vehicles having different lift characteristics to form a three-dimensional (3D) array of airborne vehicles; each airborne vehicle including a sensing device configured to generate sensor data associated with a target; (b) processing, by a computing device, sensor data associated with a target received from each of the plurality of airborne vehicles, the sensor data generated by a sensing device coupled to each airborne vehicle; and (c) generating, by the computing device, an image of the target based on the sensor data.

The implementations described herein provide a deployable sensor array system for generating an image of a target. The array includes a plurality of airborne vehicles that have different lift characteristics such that they form a 3D array. Each airborne vehicle includes a sensor device for collecting sensor data relating to the target. Because the sensor devices are formed into a 3D array, the sensor data may be formed into multiple types of images. Moreover, the sensor array system may be launched and recovered from a single mother ship.

It will be understood by those of skill in the art that information and signals may be represented using any of a variety of different technologies and techniques (e.g., data, instructions, commands, information, signals, bits, symbols, and chirps may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred implementations of the present disclosure have been described in detail, it will be understood by those skilled in the art that various modifications can be made therein without departing from the scope of the disclosure as set forth in the appended claims.

A controller, computing device, or computer, such as described herein, including the on and off-board BPL modems, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A deployable airborne sensor array system comprising:
    a first tether configured to be coupled to a common position on an aircraft and deployed from the aircraft;
    a first airborne vehicle coupled to the first tether;

a second tether, a third tether, a fourth tether, and a fifth tether, comprising respective first ends, coupled to a rear portion of the first airborne vehicle such that connection of the second tether, the third tether, the fourth tether, and the fifth tether originate from the common position on the aircraft, and respective second ends;

a plurality of airborne vehicles including a second airborne vehicle, a third airborne vehicle, a fourth airborne vehicle, and a fifth airborne vehicle coupled to the respective second ends of the second, third, fourth, and fifth tethers, respectively, wherein each of the plurality of airborne vehicles includes different biased lift characteristics relative to one another and, wherein, the second and the third airborne vehicles include respective unbalanced wings to cause the second and the third airborne vehicles to respectively glide to the left and to the right of the aircraft, and the fourth and the fifth airborne vehicles include positive and negative lift profiles, respectively, to cause the fourth and the fifth airborne vehicles to respectively glide above and below the aircraft;

wherein each of the first, second, third, fourth, and fifth airborne vehicles comprise a respective imaging camera configured to capture a plurality of images of a target and generate image data associated with the target, wherein the first, second, third, fourth, and fifth airborne vehicles establish a three-dimensional (3D) array of sensors operating coherently to capture a 3D view of the target at an instant in time; and a computing device configured to:

aim the respective imaging cameras at the target;

instruct the respective imaging cameras to capture a two-dimensional (2D) image of the target at varying times;

interleave captured 2D images based on a time at which each 2D image was captured to combine the image data received from the respective imaging camera of each of the first, second, third, fourth, and fifth airborne vehicles; and generate a high-speed video of the target based on the combined image data.

2. A method comprising:

deploying a sensor array system from an aircraft, the sensor array system including:

a first tether coupled to the aircraft at a common position;

a first airborne vehicle coupled to the first tether;

a second tether, a third tether, a fourth tether, and a fifth tether, comprising respective first ends coupled to a rear portion of the first airborne vehicle such that connection of the second tether, the third tether, the fourth tether, and the fifth tether originate from the common position on the aircraft, and respective second ends;

a plurality of airborne vehicles including a second airborne vehicle, a third airborne vehicle, a fourth airborne vehicle, and a fifth airborne vehicle coupled to the respective second ends of the second, third, fourth, and fifth tethers, respectively, wherein each of the plurality of airborne vehicles includes different biased lift characteristics relative to one another and, wherein, the second and the third airborne vehicles include respective unbalanced wings to cause the second and the third airborne vehicles to respectively glide to the left and to the right of the aircraft, and the fourth and the fifth airborne vehicles include positive and negative lift profiles, respectively, to cause the fourth and the fifth airborne vehicles to respectively glide above and below the aircraft;

wherein each of the first, second, third, fourth, and fifth airborne vehicles includes a respective imaging camera configured to capture a plurality of images of a target and generate image data associated with the target, wherein the first, second, third, fourth, and fifth airborne vehicles establish a three-dimensional (3D) array of sensors operating coherently to capture a 3D view of the target at an instant in time;

aiming the respective imaging cameras at the target;

instructing the respective imaging cameras to capture a two-dimensional (2D) image of the target at varying times;

interleaving, by a computing device, captured 2D images based on a time at which each 2D image was captured to combine image data associated with the target received from each of the first, second, third, fourth, and fifth airborne vehicles; and generating, by the computing device, a high-speed video of the target based on combined image data.

* * * * *